(12) United States Patent
Malligere et al.

(10) Patent No.: US 10,501,189 B2
(45) Date of Patent: Dec. 10, 2019

(54) BASEFRAME TUBE CLAMPING DEVICE (71) Applicant: Safran Seats USA LLC, Gainesville, TX (US)

(72) Inventors: Girish J. Malligere, Lake Dallas, TX (US); Michael Willey, Denton, TX (US)

(73) Assignee: Safran Seats USA LLC, Gainesville, TX (US)

(*) Notice: Subject to any disclaimer, the term of this patent is extended or adjusted under 35 U.S.C. 154(b) by 68 days.

(21) Appl. No.: 15/756,280

(22) PCT Filed: Apr. 18, 2016

(86) PCT No.: PCT/US2016/028060
§ 371 (c)(1),
(2) Date: Feb. 28, 2018

(87) PCT Pub. No.: WO2017/044157
PCT Pub. Date: Mar. 16, 2017

(65) Prior Publication Data
US 2018/0244393 A1 Aug. 30, 2018

Related U.S. Application Data

(60) Provisional application No. 62/217,324, filed on Sep. 11, 2015.

(51) Int. Cl.
*A47C 7/02* (2006.01)
*F16B 11/00* (2006.01)
(Continued)

(52) U.S. Cl.
CPC .......... *B64D 11/0648* (2014.12); *F16B 2/10* (2013.01); *F16B 7/0433* (2013.01); *F16M 13/02* (2013.01)

(58) Field of Classification Search
CPC ... B64D 11/06; B64D 11/0696; B64D 11/064; B64D 11/0648
See application file for complete search history.

(56) References Cited

U.S. PATENT DOCUMENTS 3,037,812 A * 6/1962 Monroe ................ B64D 11/06
297/362.13
4,375,300 A * 3/1983 Long ...................... B60N 2/242
244/122 R
(Continued)

FOREIGN PATENT DOCUMENTS

FR  806815   12/1936
FR  1400577   5/1965
(Continued)

OTHER PUBLICATIONS

International Patent Application No. PCT/US2016/028060, International Search Report and Written Opinion, dated Aug. 8, 2016.

*Primary Examiner* — Shin H Kim
(74) *Attorney, Agent, or Firm* — Kilpatrick Townsend & Stockton LLP; Dean W. Russell; James P. Barker (57) ABSTRACT

Described are baseframe tube clamps having fulcrum elements at one end, contact surfaces for contacting a baseframe tube, and a securement element at a second end. The fulcrum elements can contact a contact surface of a seat row assembly component, such that, when a baseframe tube clamp is assembled with a seat row assembly component and a baseframe tube, the baseframe tube clamp can press on the seat row assembly component via the fulcrum elements and press on the baseframe tube so as to restrict motion of the baseframe tube relative to the seat row assembly component.

20 Claims, 10 Drawing Sheets (51) Int. Cl.
  *B64D 11/06* (2006.01)
  *F16B 2/10* (2006.01)
  *F16B 7/04* (2006.01)
  *F16M 13/02* (2006.01)

(56) References Cited

U.S. PATENT DOCUMENTS

| | | | | |
|---|---|---|---|---|
| 4,489,978 | A * | 12/1984 | Brennan | B60N 2/242 244/118.6 |
| 4,718,719 | A * | 1/1988 | Brennan | B64D 11/06 244/122 R |
| 5,553,923 | A * | 9/1996 | Bilezikjian | B64D 11/06 297/232 |
| 5,727,762 | A * | 3/1998 | Cosentino | F16L 3/1016 248/154 |
| 6,478,256 | B1 * | 11/2002 | Williamson | B60N 2/242 244/122 R |
| 6,644,738 | B2 * | 11/2003 | Williamson | B60N 2/682 244/122 R |
| 6,669,295 | B2 * | 12/2003 | Williamson | B60N 2/015 297/301.2 |
| 6,672,661 | B2 * | 1/2004 | Williamson | B60N 2/015 297/232 |
| 6,749,266 | B2 * | 6/2004 | Williamson | B64D 11/06 297/248 |
| 7,857,259 | B2 * | 12/2010 | Baatz | B64C 1/20 244/118.6 |
| 8,393,680 | B2 * | 3/2013 | Zimmermann | B64D 11/0693 297/248 |
| 9,573,688 | B2 * | 2/2017 | Pozzi | B64D 11/0631 |
| 9,718,552 | B2 * | 8/2017 | Zheng | B64D 11/0648 |
| 10,322,808 | B2 * | 6/2019 | Alamgir | B64D 11/06 |
| 2014/0375090 | A1 * | 12/2014 | Wegenka | B60N 2/242 297/188.09 |
| 2017/0021933 | A1 * | 1/2017 | Pozzi | B64D 11/0636 |
| 2018/0244393 | A1 * | 8/2018 | Malligere | B64D 11/0648 |
| 2018/0281970 | A1 * | 10/2018 | Hodgkinson | F16B 1/00 |
| 2019/0002106 | A1 * | 1/2019 | Stachel | B64D 11/0648 |
| 2019/0047710 | A1 * | 2/2019 | Bell | B60N 2/68 |
| 2019/0152607 | A1 * | 5/2019 | Pinger | B60N 2/028 |

FOREIGN PATENT DOCUMENTS

| | | |
|---|---|---|
| FR | 2360441 | 3/1978 |
| GB | 609439 | 9/1948 |
| WO | 2013109751 | 7/2013 |

* cited by examiner

BASEFRAME TUBE CLAMPING DEVICE

CROSS REFERENCE TO RELATED APPLICATIONS

This application is related to and claims priority benefits from U.S. Provisional Application Ser. No. 62/217,324 ("the '324 application"), filed on Sep. 11, 2015, entitled BASEFRAME TUBE CLAMPING DEVICE. The '324 application is hereby incorporated in its entirety by this reference.

FIELD OF THE INVENTION

The field of the invention relates to structural components of furnishings for passenger vehicles such as aircrafts.

BACKGROUND

The cabin of a typical passenger aircraft is dominated by rows of seats for seating passengers. These seats are typically formed of a metal structure having attachment points for components which are fastened to the structure of the seat assembly. Typically the structure includes seat leg assemblies that attach to anchor points in the passenger cabin, tubular structural members, or baseframe tubes, that connect to the seat posts and connect the seat posts in each row together, and spreaders which attach to the tubular structural members for providing attachment points for various other parts of the seats. The seat legs and spreaders are routinely connected with the tubular structural members by connectors (e.g. through-bolts) and/or via partial deformation of the seat legs and spreaders to tightly grip the tubular structural members.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present disclosure, baseframe tube clamp for a passenger seat row assembly are disclosed. The baseframe tube clamps can include one or more fulcrum elements for contacting one or more contact elements of a structural component of a seat row assembly, one or more clamping surfaces for contacting a baseframe tube of the seat assembly, and a securement element positioned distal of the clamping surface from the fulcrum element for attaching the clamp to the structural component. The baseframe tube clamps can be configured to grip a baseframe tube when engaged to the structural component of the seat row assembly and to a baseframe tube fitted therethrough.

According to certain embodiments of the present disclosure, a seat row assembly can include a collection of seat row assembly components, at least one baseframe tube, and a collection of baseframe tube clamps. Each seat row assembly component of the collection of seat row assembly components can include: a connecting element sized to accommodate a baseframe tube; a contact element positioned at a first side of the connecting element; and a securement element positioned at a second side of the connecting element. Each baseframe tube clamp can include a fulcrum element, a clamping surface, and a second securement element for attaching each baseframe tube clamp to a respective securement element of a seat row assembly component. The clamping surface of each baseframe tube clamp is between the fulcrum element and the securement element. Each seat row assembly component is connected a baseframe tube by the baseframe tube being inserted through the securement element in each respective seat row assembly component; and the baseframe tube is secured to each respective seat row assembly component by a respective baseframe tube clamp. The fulcrum element of each baseframe tube clamp is in contact with a respective contact element a respective seat row assembly component. The clamping surface of each baseframe tube clamp is in contact with the at least one baseframe tube; and the second securement element of each baseframe tube clamp is connected with a respective securement element of a seat row assembly component.

According to certain embodiments of the present disclosure, a method of assembling a seat row assembly can include positioning a collection of seat row assembly components in a passenger cabin. Each seat row assembly component has a connecting feature, a contact element at a first side of the connecting feature, and a securement element at a second side of the connecting feature. The method can include inserting a baseframe tube through the connecting feature in each seat row assembly component and positioning baseframe tube clamps such that a fulcrum element of each baseframe tube clamp contacts a respective contact element of a seat row assembly component. The clamping surface at a midpoint of each baseframe tube clamp contacts the baseframe tube. Each baseframe tube connects with a respective securement element of a respective seat row assembly component, such that the fulcrum elements of the baseframe tube clamps each press against the respective contact elements of the respective seat row assembly components, and the clamping surfaces of the baseframe tube clamps each press against a baseframe tube.

DETAILED DESCRIPTION

Embodiments are described with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Generally, passenger seat row assemblies are assembled perpendicular to a primary axis of a passenger cabin, such that passengers face forward in the cabin. (See FIG. 1). Seat leg assemblies 104a, 104b, which connect the seat row assemblies to the floor of the cabin, are typically oriented substantially parallel to a primary axis of the passenger cabin, such that the seat leg assemblies can have anchoring points fore and aft. Baseframe tubes 130, 132 are generally connected with the seat leg assemblies 104a, 104b (and spreaders 120a-d or other components) orthogonal to this primary axis. Thus, baseframe tubes are typically passed orthogonal to and through multiple seat leg assemblies, spreaders, and/or other structural parts of seat row assemblies.

The described embodiments provide for a baseframe tube clamp for improved ease of assembly and improved structural characteristics for passenger seats. While the baseframe tube clamp and seat assemblies using baseframe tube clamp are discussed for use with aircraft seats, they are by no means so limited. Rather, embodiments of the baseframe tube clamp may be used in passenger seats or other seats of any type or otherwise as desired.

The subject matter of the present disclosure may be better understood by reference to known seat row assembly components. For example, FIGS. 1-3 show a conventional seat row assembly (2) (FIG. 1), including conventional seat leg assemblies 104a, 104b (detail shown in FIG. 2) and conventional spreaders 120a-d (detail shown in FIG. 2).

Figure 1:
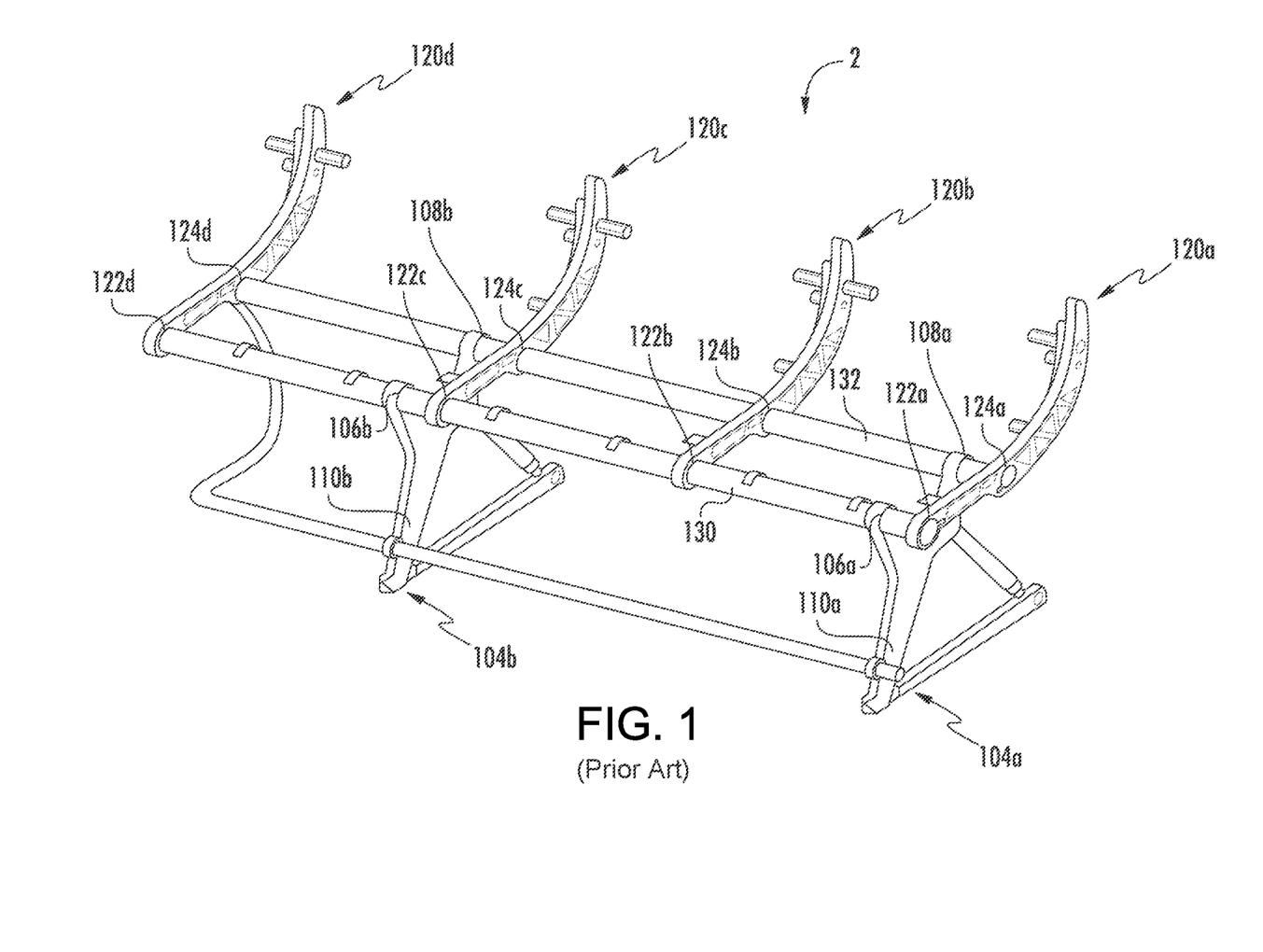
FIG. 1 is a perspective view of a prior art seat row assembly, according to certain embodiments.

As shown in FIG. 1, a seat row assembly 2 may comprise two or more seat leg assemblies 104a, 104b, each having connecting features 106a, 106b and 108a, 108b. Baseframe tubes 130, 132 may be passed through the connecting features 106a, 106b and 108a, 108b of the seat leg assemblies 104a, 104b for aligning and/or connecting the seat leg assemblies to one another. The baseframe tubes 130, 132 can also support spreaders 120a-d which provide for connection of additional seat components. The baseframe tubes 130, 132 can be passed through connecting features 122a-d, 124a-d in the spreaders 120a-d at appropriate spans for accommodating any additional seat components. However, conventional methods of securing the baseframe tubes 130, 132 can impair the structural integrity of the baseframe tubes 130, 132, the seat leg assemblies 104a, 104b, or the spreaders 120a-d.

Figure 2:
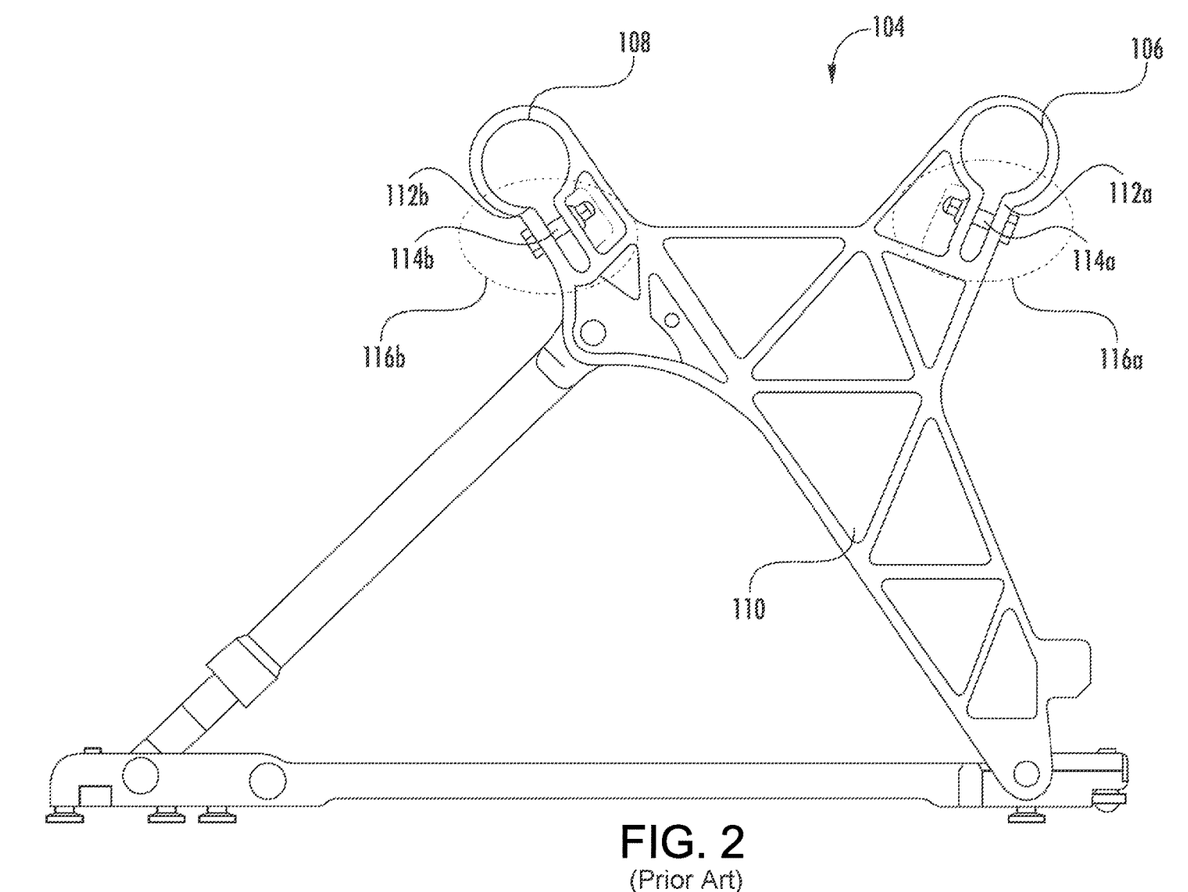
FIG. 2 is a side plan view of a prior art seat leg assembly for a seat row assembly.
Figure 3:
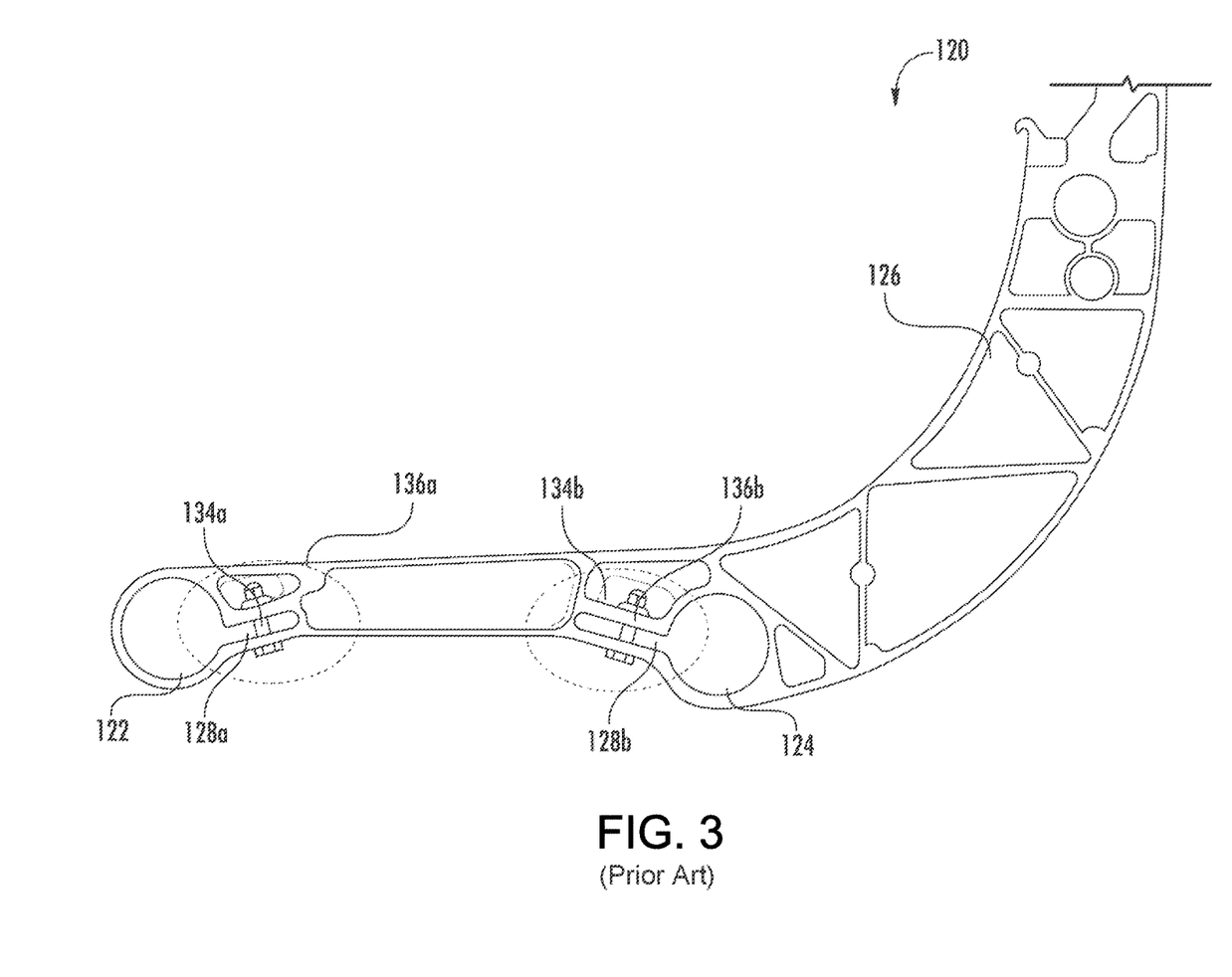
FIG. 3 is a side plan view of a prior art seat spreader for a seat row assembly.

FIG. 2 shows an example of a seat leg assembly 104 that uses conventional methods of securing baseframe tubes. The seat leg assembly 104 has a body 110 and connecting features 106, 108 for accommodating baseframe tubes. The connecting features 106, 108 include voids 112a, 112b and bolts 114a, 114b which can be tightened to deform the seat leg assembly 104 within deformation regions 116a, 116b. The deformation regions 116a, 116b are prone to break in a primary failure mode if stresses on the seat leg assembly 104 exceed an extreme threshold. Similarly, FIG. 3 shows an example of a spreader 120 having a spreader body 126 and connecting features 122, 124 for accommodating baseframe tubes. The connecting features 122, 124 have voids 128a, 128b and bolts 134a, 134b which can be tightened to deform the spreader 120 within deformation regions 136a, 136b. Similar to what was described above with reference to FIG. 2, the deformation regions 136a, 136b are prone to break in a primary failure mode if stresses on the spreader 120 exceed an extreme threshold.

Conversely, aspects of certain embodiments of the present disclosure, as shown in FIGS. 4-10, provide for a baseframe tube clamp that can provide securement of a baseframe tube to a seat assembly component without requiring deformation of the primary seat assembly component. By avoiding deformation of the primary seat assembly components, primary part failures can be reduced. Furthermore, seat row assemblies using baseframe tube clamps may be assembled more easily than conventional seat row assemblies.

Figure 4:
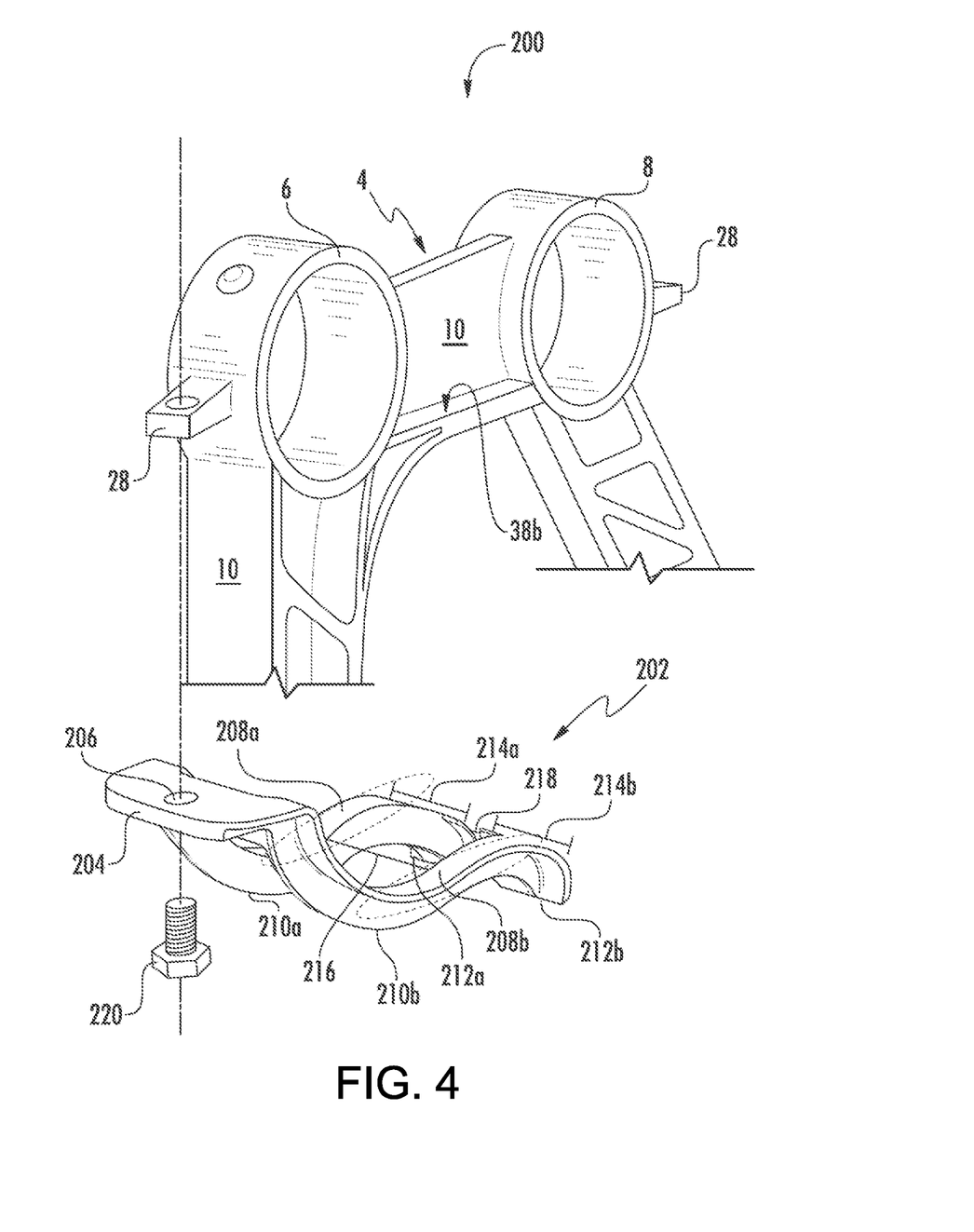
FIG. 4 is a perspective view of a baseframe tube clamp and a compatible seat leg assembly, according to certain embodiments.

According to certain embodiments of the present disclosure, as shown in FIG. 4, a baseframe tube clamp 202 comprises a flange 204 at a first end with a securement element 206 and a pair of fulcrum elements 212a, 212b and a second end opposite the first end. Two legs 210a, 210b span between the flange 204 and the fulcrum elements 212a, 212b. The legs 210a, 210b have a midpoint spacing 216 sufficiently wide to accommodate or span a connecting feature 6 of a seat assembly component. In some cases, the connecting feature 6 may be a simple slip-fit hole in the seat leg body 10. The clamp legs have an end spacing 218 between the fulcrum elements 212a, 212b sufficiently narrow that the fulcrum elements 212a, 212b can each contact a contact surface of a seat assembly component (e.g. contact surfaces 38a, 38b of the seat leg assembly 4). The clamp legs 210a, 210b have clamping surfaces 208a, 208b which are shaped to accommodate a baseframe tube (e.g. baseframe tube 30 shown in FIG. 5). The fulcrum elements 212a, 212b are offset from the clamping surfaces 208a, 208b by fulcrum distances 214a, 214b (collectively, 214). The fulcrum distances 214a, 214b may be the same distance. The fulcrum 214 may be described with reference to the clamping surfaces 208a, 208b, or may be described with reference to an arc defined by the clamping surfaces. In some cases, a fulcrum distance 214 may be approximately 0.5 to 0.75 inches. In some other cases, a fulcrum distance 214 may be approximately 0.5 to 1.5 inches, or any other suitable distance.

According to certain embodiments, the baseframe tube clamp 202 is configured to connect with a seat assembly component, such as the seat leg assembly 4 shown in FIG. 4. For example, in a seat assembly 200, the fulcrum elements 212a, 212b are spaced to span the body 10 of the seat leg assembly 4 adjacent to contact surfaces 38a, 38b. The clamp legs 210a, 210b are spaced to span the connecting feature 6 of the of the seat leg assembly 4. The fulcrum elements 212a, 212b can be supported by contact surfaces 38a, 38b. A securement element 28 of the seat leg assembly 4 is aligned to interact with a securement element 206 of the baseframe tube clamp 202. For example, the securement elements 28, 206 can be fastened together with a connector 220, which in some embodiments may be a bolt. In alternative embodiments, the securement elements 28, 206 can be fastened together via any suitable means, such as a screw, rivet, nut and bolt, or similar means. In some embodiments, the securement elements 28, 206 may be fastened together using an adjustable fastening means, e.g. a bolt or a nut and bolt combination, such that a fastening force can be adjusted during installation. For example, fastening force may be determined by exerting a designated torque on the connector 220, which engages the baseframe tube clamp 202. When the baseframe tube clamp 202 is engaged, the clamping surfaces 208a, 208b are moved to impinge on the connecting feature 6 of the seat leg assembly 4.

The baseframe tube clamp 202 may be arranged to engage more than one part of the seat leg assembly 4. For example, in embodiments, a baseframe tube clamp 202 may be connected to a second connecting feature 8 of the seat leg assembly 4. In some cases, baseframe tube clamps may be used simultaneously at both the first and second connecting features 6, 8.

According to various embodiments, the seat assembly components and baseframe tube clamps may be configured to accommodate baseframe tubes having diameters of approximately 2", although baseframe tubes of any suitable diameter may be accommodated. For example, in some cases, seat assembly components and baseframe tube clamps may accommodate baseframe tubes ranging in size from approximately 1.8" to 2.5". In some cases, a clearance can be provided between a connecting feature of a seat assembly component and a baseframe tube, e.g., where the connecting feature is a slip-fit through-hole, the through-hole is preferably larger than an outer diameter of the baseframe tube. In some cases, the clearance is sufficient to allow the baseframe tube to slide readily through the connecting feature.

According to various embodiments, the baseframe tube clamp 202 can curve around a portion of a baseframe tube defined by an arc length around the baseframe tube. In particular, contact surfaces such as clamping surfaces 208a, 208b can partially wrap about a baseframe tube by an arc ranging from about 120 degrees to about 150 degrees. Various embodiments may partially wrap around the baseframe tube by any other suitable arc. In some embodiments, clamping surfaces 208a, 208b can have a radius of curvature that is the same as an outer curvature of a baseframe tube. For example, in some embodiments, a radius of curvature may vary from approximately 0.9 inches to approximately 1.25 inches, or comparable range. In some other embodiments, clamping surfaces 208a, 208b can have a curvature that is slightly larger than an outer curvature of a baseframe tube, such that, when a baseframe tube clamp 202 is engaged around a baseframe tube, the baseframe tube clamp can slightly deform and cause an entire length of the contact surfaces to come into contact with the baseframe tube. Also, according to various embodiments, clamping surfaces 208a, 208b may further include a frictive surface feature, such as a frictive material layer (e.g. rubber, high-friction polymer, abrasive layer, or adhesive layer) or frictive surface treatment (e.g. roughened surface, grooves, teeth, or comparable surface features) for better gripping a baseframe tube, thereby preventing twist or translation of a baseframe tube when engaged with the baseframe tube clamp 202.

Figure 5:
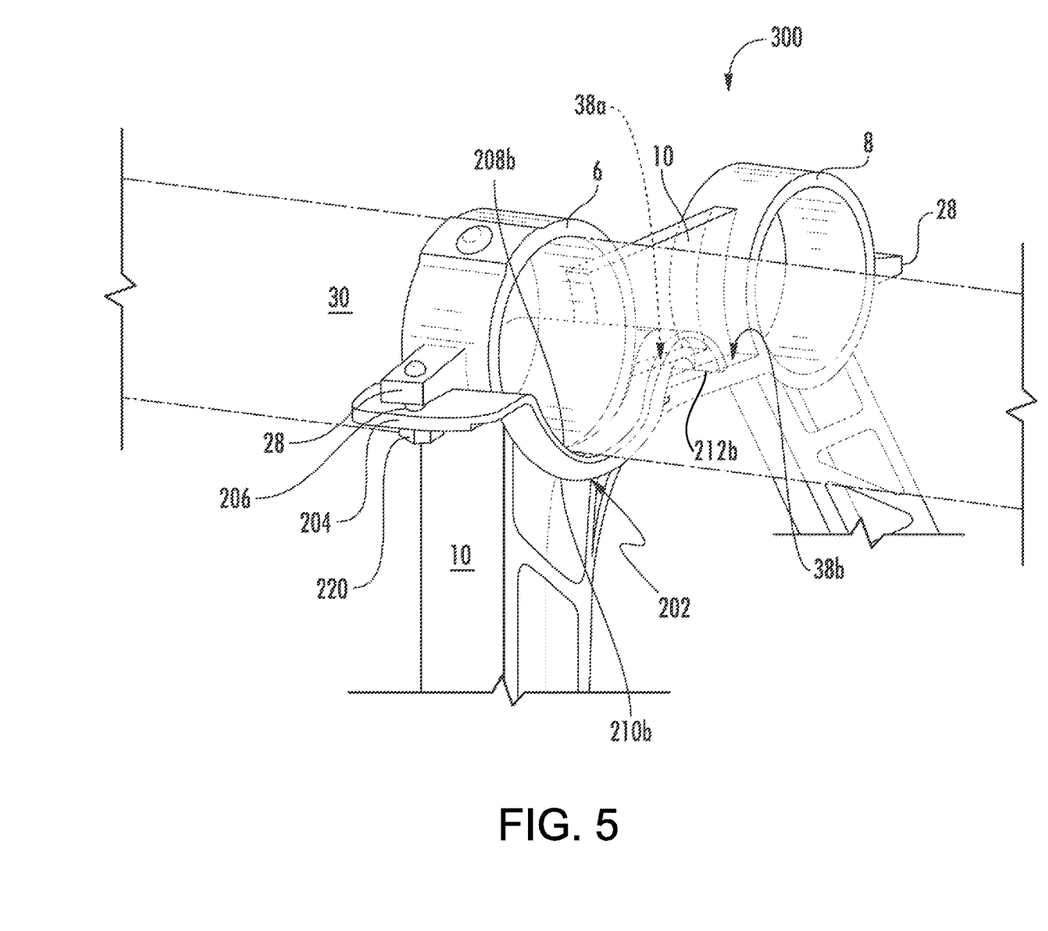
FIG. 5 is a perspective view of the baseframe tube clamp of FIG. 4 assembled with the compatible seat leg assembly of FIG. 4 and with a baseframe tube, according to certain embodiments.

FIG. 5 illustrates an assembly 300 of the seat leg assembly 4 of FIG. 4 assembled with the baseframe tube clamp 202, showing the path of a baseframe tube 30 through the connecting feature 6 of the seat leg assembly, according to certain embodiments. The baseframe tube 30 is inserted through the connecting feature 6 of the seat leg assembly 4. The baseframe tube clamp 202 is arranged with the fulcrum elements 212a (FIG. 6), 212b in contact with the contact surfaces 38a, 38b. The securement element 206 of the baseframe tube clamp 202 is engaged with the securement element 28 of the seat leg assembly 4 via a connector 220, such that the clamping surfaces 208a, 208b of the baseframe tube clamp 30 are pressed against the baseframe tube 30.

Figure 6:
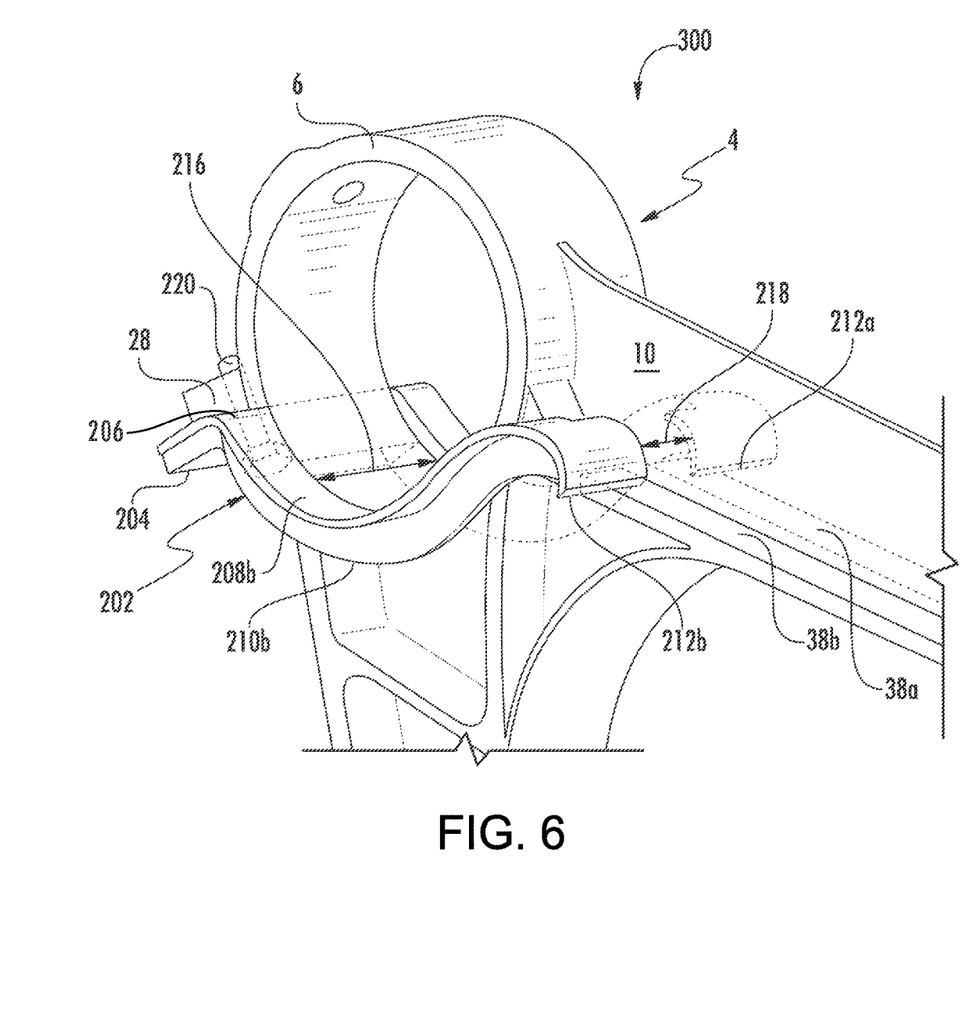
FIG. 6 is a another perspective view of the baseframe tube clamp of FIG. 4 assembled with the compatible seat leg assembly of FIG. 4, according to certain embodiments.

FIG. 6 illustrates another view of the assembly 300 of the seat leg assembly 4 and baseframe tube clamp 202. In this view, the fulcrum elements 212a, 212b of the baseframe tube clamp 202 are shown in contact with the contact surfaces 38a, 38b of the seat leg assembly 4. The fulcrum elements 212a, 212b bridge a portion of the body 10 of the seat leg assembly 4, but are narrower than the connecting feature 6. The legs 210a, 210b of the baseframe tube clamp span the connecting feature 6. When the baseframe tube clamp 202 is engaged to the seat leg element 4, the clamping surfaces 208a, 208b partially impinge on the connecting feature 6 such that, when a baseframe tube (not shown) is fitted through the connecting feature, the clamping surfaces 208a, 208b exert a gripping force on the baseframe tube.

Figure 7:
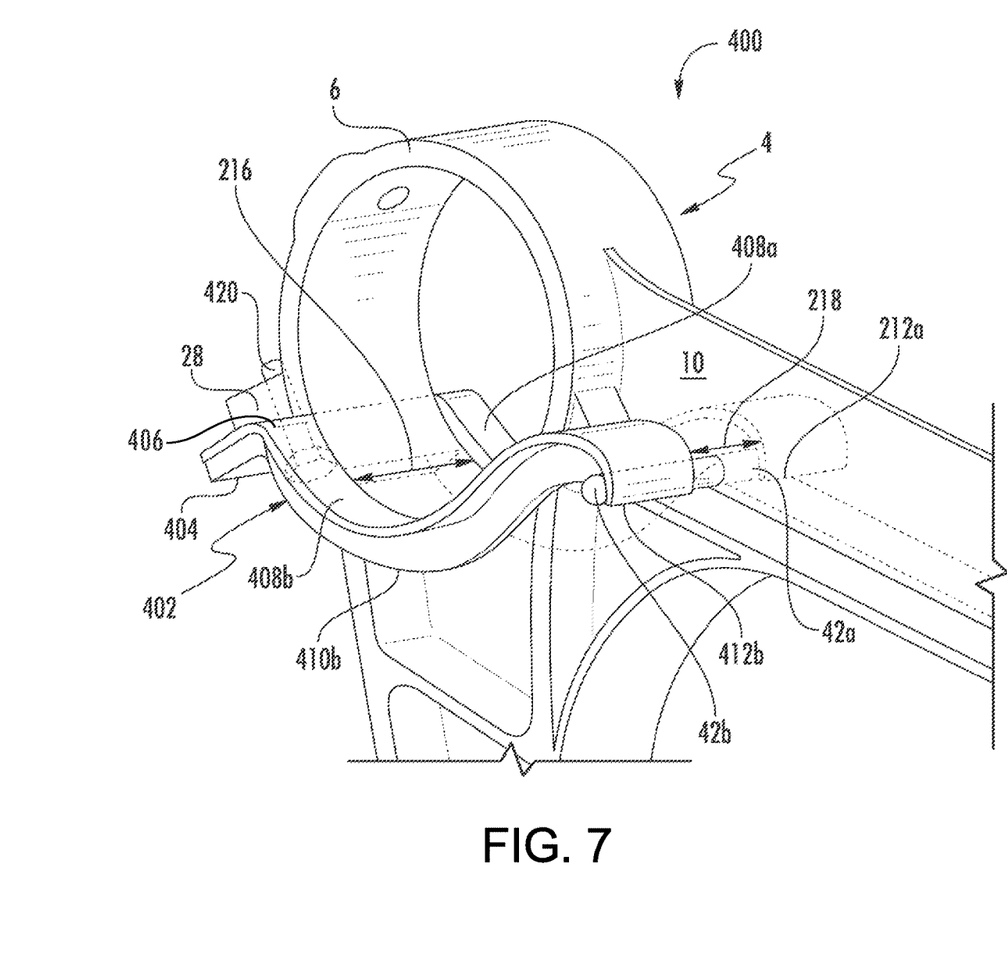
FIG. 7 is a perspective view of an alternate embodiment of a baseframe tube clamp assembled with a compatible seat leg assembly, according to certain embodiments.

FIG. 7 illustrates an assembly 400 of a seat leg assembly 4 having an additional support 42 that supports an alternative embodiment of a baseframe tube clamp 402, according to certain alternative embodiments. The alternative baseframe tube clamp 402 differs from the baseframe tube clamp 202 (FIGS. 4-6) by, e.g. the fulcrum elements 412a, 412b being configured to receive the additional support 42, as described below.

As described above with reference to FIGS. 4-6, a seat leg assembly 4 includes a connecting feature 6 for receiving a baseframe tube and a seat leg body 10. An additional support 42 can be connected with the seat leg assembly 4 and positioned near the connecting feature 6. The additional support 42 can be, for example, a pin, rod, bolt, or other substantially cylindrical feature that is passed through the seat leg body 10, or other comparable structure, having supporting portions 42a, 42b that extend away from the seat leg body 10. The additional support 42 is positioned so as to receive the fulcrum elements 42a, 42b of a baseframe tube clamp 402. The fulcrum elements 42a, 42b of the baseframe tube clamp 402 can include a substantially concave surface for receiving the supporting portions 42a, 42b of the additional support 42. As described above with respect to the baseframe tube clamp 202 shown in FIGS. 4-6, the baseframe tube clamp 402 can be secured to the seat leg assembly 4 so as to engage a baseframe tube that is passed through the connecting feature 6 of the seat leg assembly. The baseframe tube clamp 402 can connect with the seat leg assembly 4 via the securement elements 406 and 28 and any suitable connector, e.g., bolt 420 or comparable connector, as described above with respect to connector 220 (FIG. 4).

Figure 8:
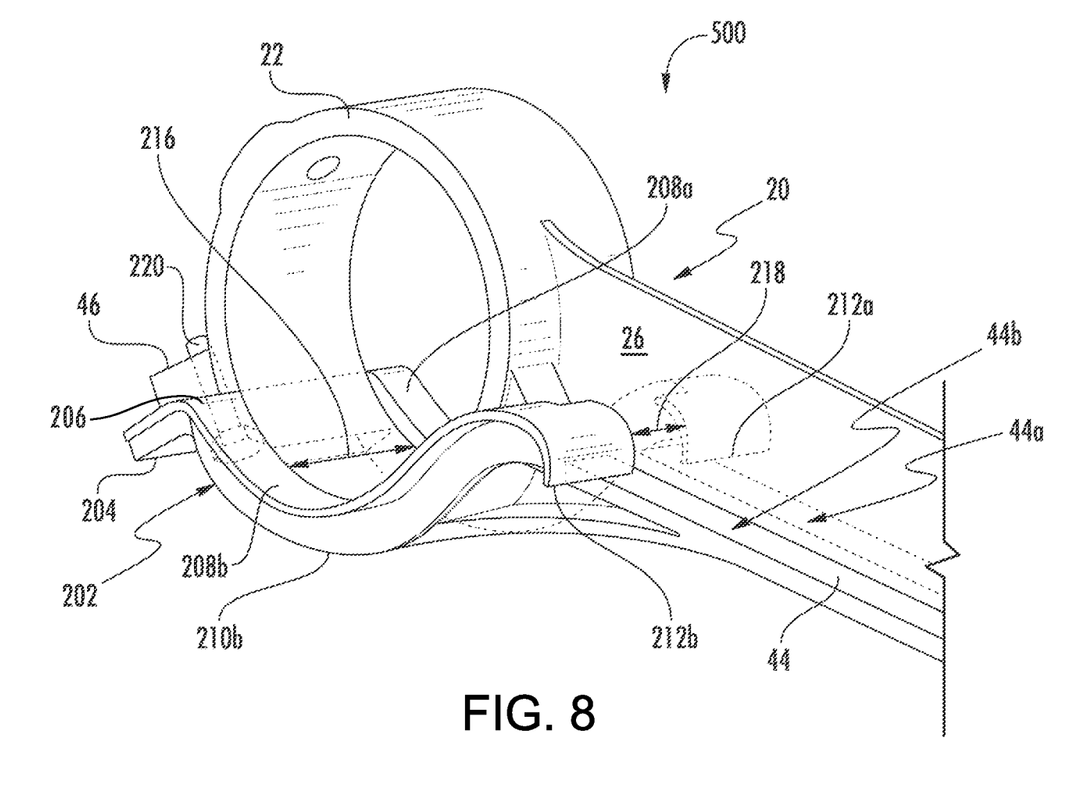
FIG. 8 is a perspective view of a baseframe tube clamp assembled with a compatible seat spreader, according to certain embodiments.

FIG. 8 illustrates an assembly 500 of a spreader 20 with a baseframe tube clamp 202, according to certain embodiments. The spreader 20 can be connected with a baseframe tube (not shown) in an assembly including one or more seat leg assemblies (FIGS. 4-6), and can be secured to the assembly using one or more baseframe tube clamps 202, in a similar securement mechanism to that described above with reference to the seat leg assembly 4 (FIGS. 4-6). For example, a spreader 20 can also include a connecting feature 22 (or multiple connecting features) for receiving a baseframe tube. The spreader 20 can also include, along the spreader body 26, contact surfaces 44a, 44b (collectively 44) for supporting the fulcrum elements 212a, 212b of the baseframe tube clamp 202. The baseframe tube clamp 202 can be secured to the spreader 20 by attaching the securement elements 24, 206 together via a connector 220. When a baseframe tube (not shown) is inserted through the connecting feature 22 and the baseframe tube clamp 202 is secured, the clamping surfaces 208a, 208b exert a gripping force on the baseframe tube.

Figure 9:
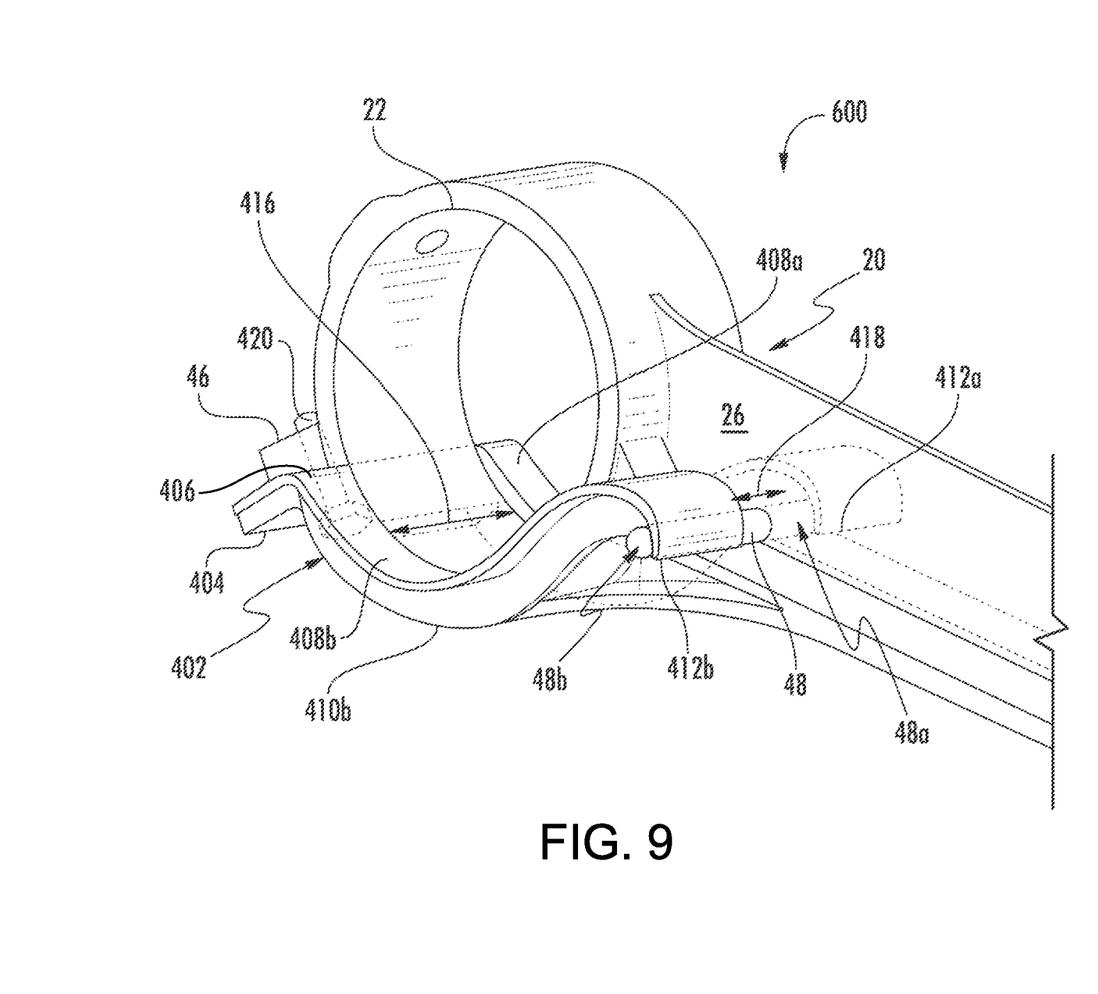
FIG. 9 is a perspective view of an alternate embodiment of a baseframe tube clamp assembled with a compatible seat spreader, according to certain embodiments.

FIG. 9 illustrates an assembly 600 of a spreader 20 having an additional support 48 that supports a baseframe tube clamp 402, according to certain alternative embodiments. The baseframe tube clamp 402 of this example assembly 600 is operable to secure a baseframe tube (not shown) to the connecting feature 22 of the spreader 20, in a similar manner to how the baseframe tube clamp 402 of assembly 400 (FIG. 7) connects a baseframe tube to the connecting feature 6 of a seat leg assembly. The baseframe tube clamp 402 has fulcrum elements 412a, 412b configured, e.g. with a substantially concave surface or groove, for receiving the additional support 48. The additional support 48 can be connected with the spreader 20 and positioned near the connecting feature 22. The additional support 28 can be, for example, a pin, rod, bolt, or other substantially cylindrical feature that is passed through the body 26 of the of the spreader 20. As described above with respect to the baseframe tube clamp 202 shown in FIGS. 4-6 and the baseframe tube clamp 402 shown in FIG. 7, the baseframe tube clamp 402 can be secured to the spreader 20 so as to engage a baseframe tube that is passed through the connecting feature 22 of the spreader. The baseframe tube clamp 402 can connect with the spreader 20 via the securement elements 406 and 46 and any suitable connector, e.g., bolt 420 or comparable connector, as described above with respect to connector 220 (FIG. 4).

Figure 10:
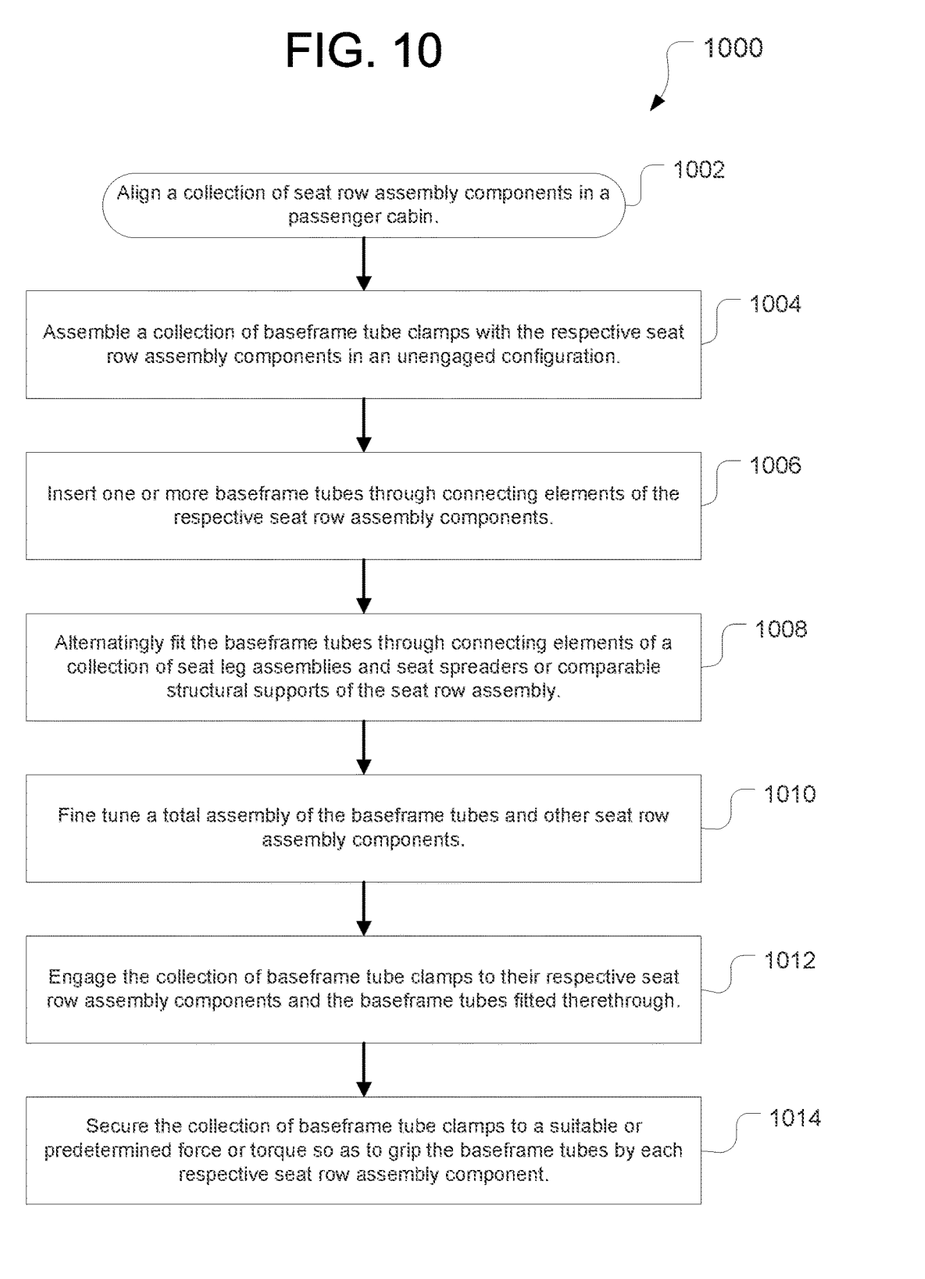
FIG. 10 illustrates an example process for assembling a seat row assembly using a baseframe tube clamp and compatible seat leg assemblies, seat spreaders, and baseframe tubes, according to certain embodiments.

FIG. 10 is a process flow diagram illustrating an example of an assembly process 1000 for assembling a seat row assembly using baseframe tube clamps, such as the baseframe tube clamps 202 and 402 described above with reference to FIGS. 4-9. First, a collection of seat row assembly components (e.g. seat leg assemblies and/or seat spreaders) may be aligned in a passenger interior space, e.g., with interior components of a passenger cabin, or with anchoring points in a cabin (act 1002). Second, a collection of baseframe tube clamps may be assembled in an unengaged configuration about the connection elements of the respective seat row assembly components, (e.g. the respective collections of seat leg assemblies and seat spreaders) (act 1004). Next, a collection of one or more baseframe tubes may be inserted into connection elements of seat row assembly components, for example, the seat leg assemblies and spreaders (act 1006). The baseframe tube(s) may be alternatingly fitted through the connection elements of the seat leg assemblies and connection elements of a collection of seat spreaders or other comparable supports (act 1008). In some cases, a number of seat leg assemblies may differ from a number of spreaders according to a design of the total assembly. For example, spreaders may typically be aligned regularly according to a standard passenger furnishing size, whereas seat leg assemblies may be aligned according to locations of anchoring points. Additional parts having similar connecting features may be likewise aligned with and connected by the baseframe tubes. The total assembly of seat leg assemblies, baseframe tubes, spreaders, and other components may be fine-tuned, adjusted, or otherwise aligned prior to securing the assembly (act 1010). When the total assembly is properly aligned, the baseframe tube clamps can be engaged, e.g. by inserting a connector to secure each baseframe tube clamp to its respective seat leg assembly, spreader, or other component (act 1012). The connectors can be tightened to a predetermined force or torque in order to cause the baseframe tube clamps to grip the baseframe tubes within the respective connecting elements of each seat leg assembly or spreader (act 1014).

In various embodiments, an assembly of a baseframe tube clamp, seat assembly component, and baseframe tube can, when the clamp is engaged, withstand at least a 16 G dynamic loading event, such as a sudden acceleration of one of the components. In some embodiments, an assembly further including spreaders and additional seat components (i.e. a fully assembled seat row) assembled with baseframe tube clamps can withstand the 16 G dynamic loading event. For example, a seat row assembly may be constructed as described above and attached with anchor points, and the anchor points subjected to a 16 G dynamic acceleration and/or deceleration without a failure of any of the components. In some cases, such an assembly can withstand a much higher dynamic acceleration without failing in a primary failure mode, e.g. clamps may fail in a fail-safe manner without breakage of any primary components (e.g. the seat leg assemblies, spreaders, and baseframe tubes).

The baseframe tube clamps, seat leg assemblies, baseframe tubes, and spreaders may be formed of the same or of different materials. For example, some or all of the above components may be formed of materials including but not limited to aluminum, stainless steel, aramid fibers, polycarbonate, polypropylene, other metallic materials, composite materials, or other similar materials.

Various embodiments may be better understood with reference to the following examples:

Example 1

There is provided a baseframe tube clamp for a passenger seat row assembly, comprising one or more fulcrum elements for contacting one or more contact elements of a structural component of a seat row assembly; one or more clamping surfaces for contacting a baseframe tube of the seat assembly, and a securement element positioned distal of the clamping surface from the fulcrum element for attaching the clamp to the structural component.

Example 2

The component of any of the preceding or subsequent examples, wherein the one or more clamping surfaces further comprise a frictive surface feature.

Example 3

The component of any of the preceding or subsequent examples, wherein the frictive surface feature further comprises one or more of: a rubber layer, a high-friction polymer layer, an abrasive layer, and an adhesive layer.

Example 4

The component of any of the preceding or subsequent examples, wherein the one or more fulcrum elements further comprise a substantially concave surface configured for receiving one of a pin, rod, or bolt.

Example 5

The component of any of the preceding or subsequent examples, wherein the one or more clamping surfaces have a concave curvature with a radius of curvature arranged to match an outer surface of baseframe tube.

Example 6

The component of any of the preceding or subsequent examples, wherein the radius of curvature is approximately 0.9 inches to approximately 1.25 inches, and wherein an arc length of the one or more clamping surfaces is approximately 120 to 150 degrees.

Example 7

The component of any of the preceding or subsequent examples, wherein the one or more clamping surfaces have a concave curvature with a radius of curvature arranged to exceed an outer surface of baseframe tube, the baseframe tube clamp being further configured to deform elastically when the baseframe tube clamp is engaged to the structural component of the seat assembly and to a baseframe tube inserted therethrough, such that the baseframe tube clamp can deform around the baseframe tube.

Example 8

The component of any of the preceding or subsequent examples, wherein the securement element comprises a through-hole configured for receiving a bolt.

Example 9

The component of any of the preceding examples, further comprising a fulcrum length of approximately 0.5 to 0.75 inches.

Example 10

There is provided a passenger seat row assembly, comprising: a collection of seat row assembly components, at least one baseframe tube, and a collection of baseframe tube clamps; wherein: each seat row assembly component of the collection of seat row assembly components comprises: a connecting element sized to accommodate the at least one baseframe tube; a contact element positioned at a first side of the connecting element; and a first securement element positioned at a second side of the connecting element. Each baseframe tube clamp of the collection of baseframe tube clamps comprises: a fulcrum element, a clamping surface, and a second securement element for attaching each baseframe tube clamp to a respective first securement element, wherein the clamping surface is between the fulcrum element and the second securement element. Each seat row assembly component of the collection of seat row assembly components is connected with the at least one baseframe tube by the baseframe tube being inserted through the first securement element in each respective seat row assembly component; and the at least one baseframe tube is secured to each respective seat row assembly component of the collection of seat row assembly components by a respective baseframe tube clamp of the collection of baseframe tube clamps. The fulcrum element of each baseframe tube clamp of the collection of baseframe tube clamps is in contact with the respective contact element of each respective seat row assembly component of the collection of seat row assembly components, the clamping surface of each baseframe tube clamp of the collection of baseframe tube clamps is in contact with the at least one baseframe tube, and the second securement element of each baseframe tube clamp of the collection of baseframe tube clamps is connected with a respective first securement element of the collection of seat row assembly components.

Example 11

The assembly of any of the preceding or subsequent examples, wherein the collection of seat row assembly components comprises a plurality of seat leg assemblies and a plurality of seat spreaders.

Example 12

The assembly of any of the preceding or subsequent examples, wherein the connecting elements of the collection of seat row assembly components comprise through-holes configured to fit the at least one baseframe tube therethrough in a slip fit.

Example 13

The assembly of any of the preceding or subsequent examples, wherein the assembly can withstand a dynamic loading event of at least 16 G.

Example 14

The assembly of any of the preceding examples, wherein the contact elements of the collection of seat row assembly components comprises a plurality of substantially cylindrical feature passed through each seat row assembly component of the collection of seat row assembly components.

Example 15

There is provided a method of assembling a passenger seat row assembly, the method comprising: positioning a first collection of seat row assembly components in a passenger cabin, each seat row assembly component of the first collection of seat row assembly components having a first connecting feature, a first contact element at a first side of the first connecting feature, and a first securement element at a second side of the first connecting feature; inserting a baseframe tube through the first connecting feature in each seat row assembly component of the first collection of seat row assembly components; positioning a first collection of baseframe tube clamps such that a fulcrum element of each baseframe tube clamp of the first collection of baseframe tube clamps contacts a respective contact element of each seat row assembly component of the first collection of seat row assembly components and a clamping surface at a midpoint of each baseframe tube clamp of the first collection of baseframe tube clamps contacts the baseframe tube; and securing each baseframe tube clamp of the first collection of baseframe tube clamps to a respective securement element of a respective seat row assembly component of the first collection of seat row assembly components, such that the fulcrum elements of the first collection of baseframe tube clamps each press against the respective contact elements of the respective seat row assembly components of the first collection of seat row assembly components, and such that the clamping surfaces of the first collection of baseframe tube clamps each press against the baseframe tube.

Example 16

The method of any of the previous or subsequent examples, further comprising positioning a second collection of seat row assembly components in the passenger cabin, each seat row assembly component of the second collection of seat row assembly components having a second connecting feature, a second contact element at a first side of the second connecting feature, and a second securement element at a second side of the second connecting feature; inserting the baseframe tube through the second connecting feature in each seat row assembly component of the second collection of seat row assembly components; positioning a second collection of baseframe tube clamps such that a fulcrum element of each baseframe tube clamp of the second collection of baseframe tube clamps contacts a respective contact element each seat row assembly component of the second collection of seat row assembly components and a clamping surface at a midpoint of each baseframe tube clamp of the second collection of baseframe tube clamps contacts the baseframe tube; and securing each baseframe tube clamp of the second collection of baseframe tube clamps to a respective securement element of a respective seat row assembly component of the second collection of seat row assembly components, such that the fulcrum elements of the second collection of baseframe tube clamps each press against the respective contact elements of the respective seat row assembly components of the second collection of seat row assembly components, and such that the clamping surfaces of the second collection of baseframe tube clamps each press against the baseframe tube.

Example 17

The method of any of the previous or subsequent examples, wherein each seat row assembly component of the first collection of seat row assembly components comprises a seat leg assembly, each seat row assembly component of the second collection of seat row assembly components comprises a seat spreader.

Example 18

The method of any of the previous or subsequent examples, further comprising: fine-tuning an alignment of the first collection of seat row assembly components and an alignment of the second collection of seat row assembly components prior to securing the first and second collections of baseframe tube clamps.

Example 19

The method of any of the previous or subsequent examples, wherein securing each baseframe tube clamp of the first and second collections of baseframe tube clamps comprises exerting a predetermined force on each baseframe tube clamp of the first collection of baseframe tube clamps.

Example 20

The method of any of the previous or subsequent examples, wherein securing each baseframe tube clamp of the first collection of baseframe tube clamps comprises: connecting each baseframe tube clamp of the first collection of baseframe tube clamps to a respective seat row assembly component of the first collection of seat row assembly components with a respective connector of a collection of connectors; and tightening each connector of the collection of connectors to one of a predetermined force or a predetermined torque.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A baseframe tube clamp for a passenger seat row assembly, comprising:
    one or more fulcrum elements for contacting one or more contact elements of a structural component of a seat row assembly,
    one or more clamping surfaces for contacting a baseframe tube of the seat row assembly, and
    a securement element positioned distal of the clamping surface from the fulcrum element for attaching the clamp to the structural component.

2. The baseframe tube clamp of claim 1, wherein the one or more clamping surfaces further comprise a frictive surface feature.

3. The baseframe tube clamp of claim 2, wherein the frictive surface feature further comprises one or more of: a rubber layer, a high-friction polymer layer, an abrasive layer, and an adhesive layer.

4. The baseframe tube clamp of claim 1, wherein the one or more fulcrum elements further comprise a substantially concave surface configured for receiving one of a pin, rod, or bolt.

5. The baseframe tube clamp of claim 1, wherein the one or more clamping surfaces have a concave curvature with a radius of curvature arranged to match an outer surface of baseframe tube.

6. The baseframe tube clamp of claim 5, wherein the radius of curvature is approximately 0.9 inches to approximately 1.25 inches and wherein an arc length of the one or more clamping surfaces is approximately 120 to 150 degrees.

7. The baseframe tube clamp of claim 1, wherein the one or more clamping surfaces have a concave curvature with a radius of curvature arranged to exceed an outer surface of baseframe tube, the baseframe tube clamp being further configured to deform elastically when the baseframe tube clamp is engaged to the structural component of the seat row assembly and to a baseframe tube inserted therethrough, such that the baseframe tube clamp can deform around the baseframe tube.

8. The baseframe tube clamp of claim 1, wherein the securement element comprises a through-hole configured for receiving a bolt.

9. The baseframe tube clamp of claim 1, comprising a fulcrum length of approximately 0.5 to 0.75 inches.

10. A passenger seat row assembly, comprising:
a collection of seat row assembly components, at least one baseframe tube, and a collection of baseframe tube clamps; wherein:
each seat row assembly component of the collection of seat row assembly components comprises:
a connecting element sized to accommodate the at least one baseframe tube;
a contact element positioned at a first side of the connecting element; and
a first securement element positioned at a second side of the connecting element; and
each baseframe tube clamp of the collection of baseframe tube clamps comprises:
a fulcrum element,
a clamping surface, and
a second securement element for attaching each baseframe tube clamp to a respective first securement element, wherein the clamping surface is between the fulcrum element and the second securement element;
each seat row assembly component of the collection of seat row assembly components is connected with the at least one baseframe tube by the baseframe tube being inserted through the first securement element in each respective seat row assembly component; and
the at least one baseframe tube is secured to each respective seat row assembly component of the collection of seat row assembly components by a respective baseframe tube clamp of the collection of baseframe tube clamps, wherein
the fulcrum element of each baseframe tube clamp of the collection of baseframe tube clamps is in contact with the respective contact element of each respective seat row assembly component of the collection of seat row assembly components,
the clamping surface of each baseframe tube clamp of the collection of baseframe tube clamps is in contact with the at least one baseframe tube, and
the second securement element of each baseframe tube clamp of the collection of baseframe tube clamps is connected with a respective first securement element of the collection of seat row assembly components.

11. The assembly of claim 10, wherein the collection of seat row assembly components comprises a plurality of seat leg assemblies and a plurality of seat spreaders.

12. The assembly of claim 10, wherein the connecting elements of the collection of seat row assembly components comprise through-holes configured to fit the at least one baseframe tube therethrough in a slip fit.

13. The assembly of claim 10, wherein the assembly can withstand a dynamic loading event of at least 16 G.

14. The assembly of claim 10, wherein the contact elements of the collection of seat row assembly components comprises a plurality of substantially cylindrical feature passed through each seat row assembly component of the collection of seat row assembly components.

15. A method of assembling a passenger seat row assembly, the method comprising:
positioning a first collection of seat row assembly components in a passenger cabin, each seat row assembly component of the first collection of seat row assembly components having a first connecting feature, a first contact element at a first side of the first connecting feature, and a first securement element at a second side of the first connecting feature;
inserting a baseframe tube through the first connecting feature in each seat row assembly component of the first collection of seat row assembly components;
positioning a first collection of baseframe tube clamps such that a fulcrum element of each baseframe tube clamp of the first collection of baseframe tube clamps contacts a respective contact element of each seat row assembly component of the first collection of seat row assembly components and a clamping surface at a midpoint of each baseframe tube clamp of the first collection of baseframe tube clamps contacts the baseframe tube; and
securing each baseframe tube clamp of the first collection of baseframe tube clamps to a respective securement element of a respective seat row assembly component of the first collection of seat row assembly components, such that the fulcrum elements of the first collection of baseframe tube clamps each press against the respective contact elements of the respective seat row assembly components of the first collection of seat row assembly components, and such that the clamping surfaces of the first collection of baseframe tube clamps each press against the baseframe tube.

16. The method of claim 15, further comprising:
positioning a second collection of seat row assembly components in the passenger cabin, each seat row assembly component of the second collection of seat row assembly components having a second connecting feature, a second contact element at a first side of the second connecting feature, and a second securement element at a second side of the second connecting feature;
inserting the baseframe tube through the second connecting feature in each seat row assembly component of the second collection of seat row assembly components;
positioning a second collection of baseframe tube clamps such that a fulcrum element of each baseframe tube clamp of the second collection of baseframe tube clamps contacts a respective contact element each seat row assembly component of the second collection of seat row assembly components and a clamping surface at a midpoint of each baseframe tube clamp of the second collection of baseframe tube clamps contacts the baseframe tube; and
securing each baseframe tube clamp of the second collection of baseframe tube clamps to a respective securement element of a respective seat row assembly component of the second collection of seat row assembly components, such that the fulcrum elements of the second collection of baseframe tube clamps each press against the respective contact elements of the respective seat row assembly components of the second collection of seat row assembly components, and such that the clamping surfaces of the second collection of baseframe tube clamps each press against the baseframe tube.

17. The method of claim 16, wherein each seat row assembly component of the first collection of seat row assembly components comprises a seat leg assembly, and each seat row assembly component of the second collection of seat row assembly components comprises a seat spreader.

18. The method of claim 16, further comprising:
fine-tuning an alignment of the first collection of seat row assembly components and an alignment of the second collection of seat row assembly components prior to securing the first and second collections of baseframe tube clamps.

19. The method of claim 16, wherein securing each baseframe tube clamp of the first and second collections of baseframe tube clamps comprises exerting a predetermined force on each baseframe tube clamp of the first collection of baseframe tube clamps.

20. The method of claim 15, wherein securing each baseframe tube clamp of the first collection of baseframe tube clamps comprises:
- connecting each baseframe tube clamp of the first collection of baseframe tube clamps to a respective seat row assembly component of the first collection of seat row assembly components with a respective connector of a collection of connectors; and
- tightening each connector of the collection of connectors to one of a predetermined force or a predetermined torque.

* * * * *